April 4, 1967  T. E. BROWNE, JR  3,312,898
POLYPHASE CURRENT MEASURING DEVICE USING SEVERAL SIGNAL
DETECTORS EACH POSITIONED TO RESPOND TO ONLY ONE
PHASE CURRENT MAGNETIC FIELD
Filed Feb. 28, 1963  2 Sheets-Sheet 1
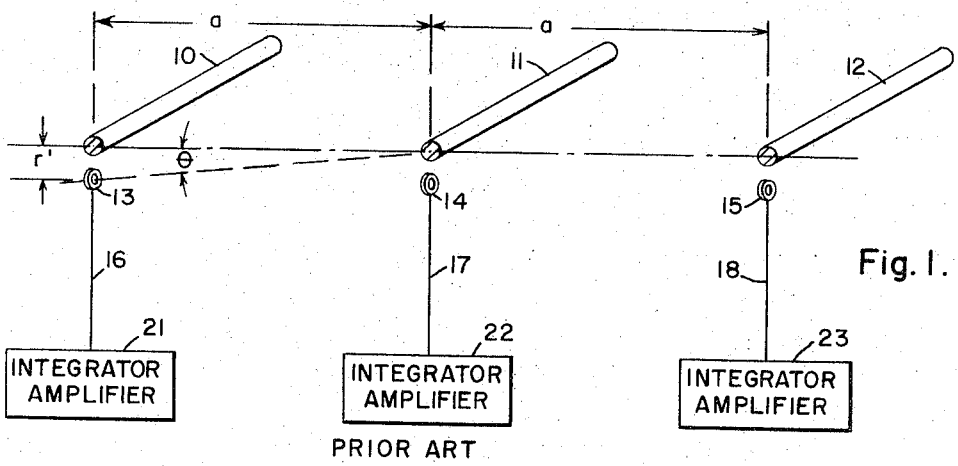
PRIOR ART
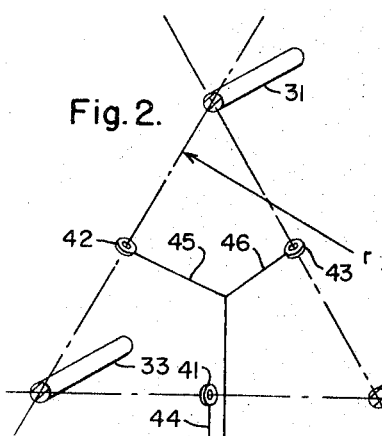
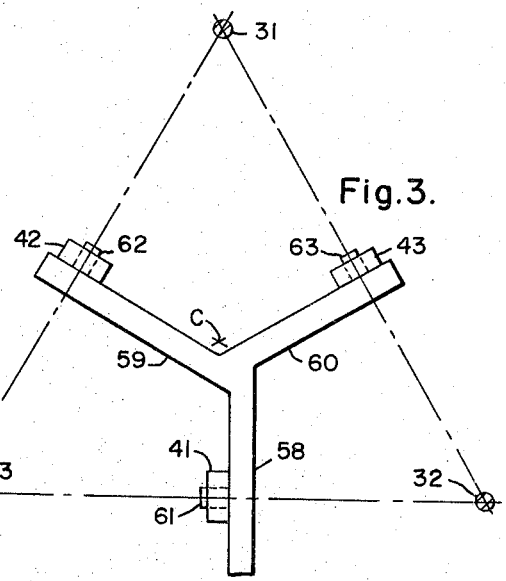
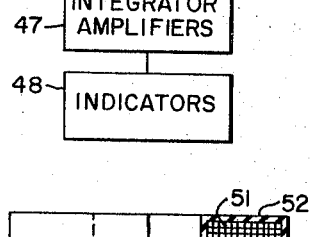
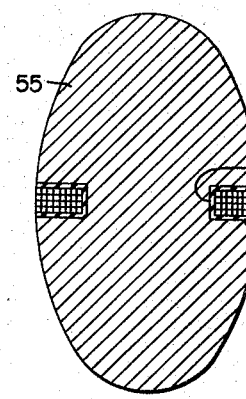
WITNESSES:
Bernard R. Gregory
James F. Young
INVENTOR
Thomas E. Browne, Jr.
BY Maury I. Hull
ATTORNEY

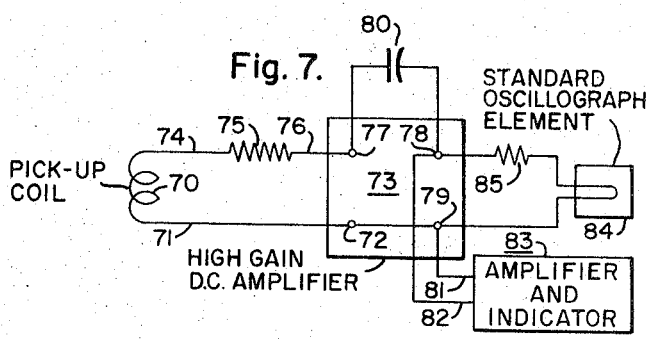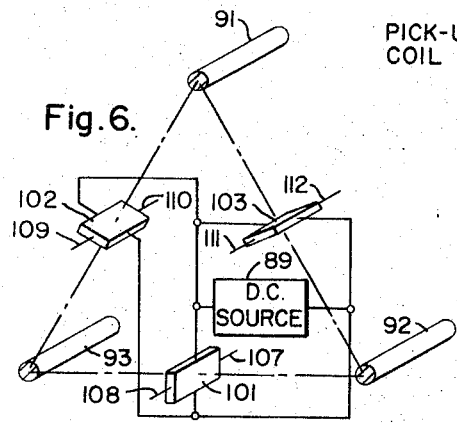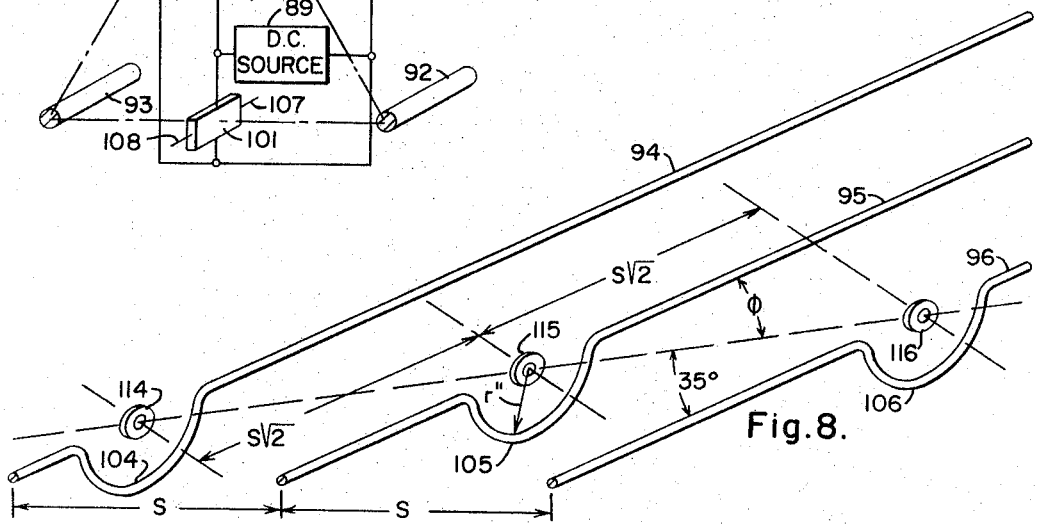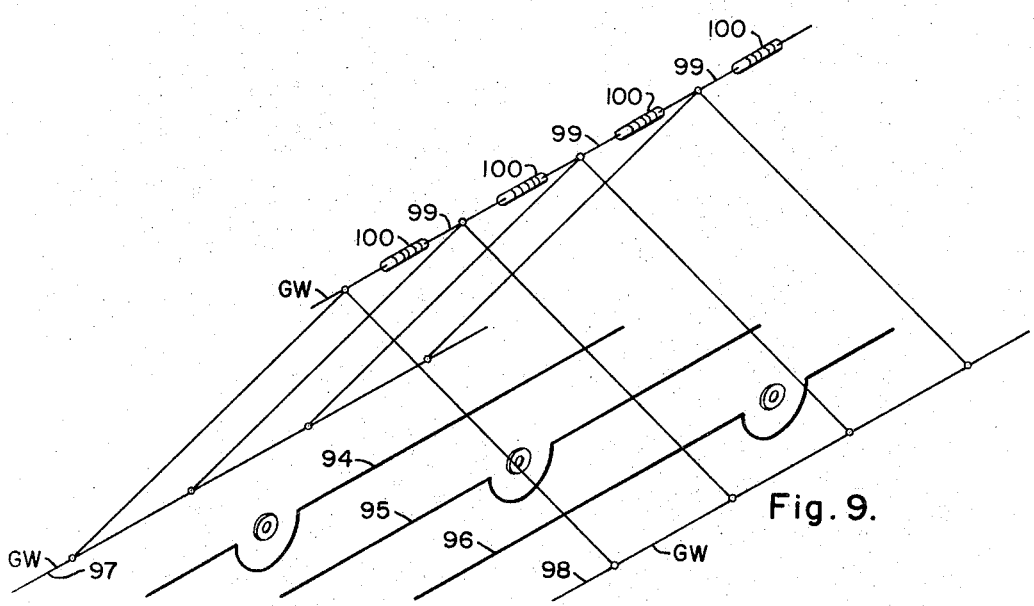

United States Patent Office 3,312,898
Patented Apr. 4, 1967

3,312,898
POLYPHASE CURRENT MEASURING DEVICE USING SEVERAL SIGNAL DETECTORS EACH POSITIONED TO RESPOND TO ONLY ONE PHASE CURRENT MAGNETIC FIELD
Thomas E. Browne, Jr., Forest Hills, Pa., assignor to Westinghouse Electric Corporation, Pittsburgh, Pa., a corporation of Pennsylvania
Filed Feb. 28, 1963, Ser. No. 261,789
16 Claims. (Cl. 324—117)

This invention relates to improvements in current measuring apparatus for high voltage transmission lines, and more particularly to apparatus responsive to a magnetic field caused by current in the line for providing a signal which is utilized to measure the current.

It is old in the art to utilize an inductor coil, disposed in predetermined position with respect to a transmission line, to have the turns thereof cut by magnetic lines of force originating at the line and have induced therein a signal having an amplitude which is a function of the current flowing in the line, and to utilize the signal for some purpose, for example, monitoring, fault indication or measurement. One such device for mounting an induction coil in predetermined pickup position with respect to a transmission line is shown in "Electrical World," Aug. 22, 1960, page 92. The electrical and mathematical theory of such a device is developed in a paper entitled, "A New Current Sensing Device," by Lawrence E. Stein, Jr., presented at the A.I.E.E. Winter General Meeting, New York, N.Y., Jan. 28–Feb. 2, 1962, Paper No. CP 62–239. However, in the prior art device and use of the aforementioned pickup coil, it has proved impossible to get an accurate reading of the current in a selected conductor of a three phase transmission line having normal spacing between conductors because the magnetic fields from other conductors of the line induce signals in the pickup coil as well as the field from the desired conductor, and it has so far proved impractical or impossible to eliminate the undesirable pickup from other conductors in a conventionally spaced line.

The apparatus of the instant invention overcomes this disadvantage of the prior art. I have discovered that by disposing pickup coils or Hall generators in certain precise positions with respect to each other, with their axes and planes oriented in certain precise ways with respect to all three of the conductors of a three phase line, that the pickup in any inductor coil or Hall generator can be limited to that received from one line, and accordingly an accurate indication of the current in the transmission line conductor can be obtained. Briefly, in summary, this is accomplished by disposing a pickup coil or Hall generator so that the magnetic lines of force caused by current in the desired conductor induce a signal in the coil or cause the generation of a signal, whereas the undesired lines of force created by or originating at the other conductors cut the coil in manners whereby the signals induced in the two sides of the coils, being simultaneously induced and being opposite in phase, cancel each other utilizing the full directional characteristics of a coil loop. Where a Hall generator is employed, only the desired conductor is in a direction or plane to create magnetic lines of force which cause a signal to be generated.

Accordingly, a primary object of the invention is to provide new and improved high voltage transmission line current measuring and monitoring apparatus.

Another object is to provide new and improved current measuring and monitoring apparatus for a transmission line utilizing inductive pickup from the conductors of the line.

A further object is to provide new and improved measuring and monitoring apparatus utilizing Hall generators disposed in predetermined positions with respect to the conductors of a multi-phase line.

These and other objects will become more clearly apparent after a study of the following specification when read in connection with the accompanying drawing, in which:

FIGURE 1 illustrates the prior art use of inductor devices for measuring or sensing currents in transmission lines;

FIG. 2 is a schematic electrical circuit diagram of apparatus of the invention according to one embodiment thereof;

FIG. 3 is an elevational view of means for mounting the pickup coils of FIG. 2 in desired positions with respect to the line conductors;

FIGS. 4 and 5 are views of suitable pickup coils for use in the apparatus of FIG. 2;

FIG. 6 is a diagrammatic view of an embodiment of the invention utilizing Hall generators;

FIG. 7 is a schematic electrical circuit diagram of a suitable integrating amplifier for use in the invention of FIG. 2;

FIG. 8 is a schematic diagram of the invention according to the preferred embodiment thereof; and FIG. 9 is an additional view of the apparatus of FIG. 8 showing means for protecting the pickup coils or Hall generators from signals which would otherwise be induced by lightning discharges to the ground wires of a transmission line system.

Referring now to the drawings, in which like reference numerals are used throughout to designate like parts, for a more detailed understanding of the invention, and in particular to FIG. 1 thereof, there are shown at 10, 11 and 12 three conductors of a high voltage transmission line, having disposed adjacent thereto respectively inductor pickup coils 13, 14 and 15 which deliver their outputs by lead means 16, 17 and 18 to three amplifier devices 21, 22 and 23 respectively, which, it is understood, may include current indicating devices, not shown. The coil arrangement of FIG. 1 is a typical arrangement of the prior art. It will be readily seen that separate indication of line currents can only be approximated by such an arrangement by utilizing proper orientation of the coils and by minimizing the ratio $r'/a$ of pickup spacing to conductor spacing. With atmospheric air as insulation, $r'/a$ cannot be much less than unity if the pickup coils are to be maintained at ground potential to protect a user of the apparatus, and so sufficient separation of current indications cannot be provided unless the conductor spacings are made impractically large for a high voltage line.

Particular reference is made now to FIG. 2, showing an embodiment of the invention where perfect separation of the current indications may be achieved with relatively remote magnetic field pickup devices utilizing only the directional properties of the loop pickup coils. It will be understood that the net response of such pickup devices is proportional not to the magnitude of the magnetic flux density in their vicinity, but to the net amount of flux passing through them, that is, to the integral over the plane surface enclosed by the coil of the component of flux perpendicular to the coil plane. In FIG. 2, the axis of each coil is so disposed that flux due to current in the undesired conductors will pass edgewise through the plane of the pickup coil, or in other words will approach the coil substantially in its plane, and so will produce no net flux linkages with the coil, and so no resulting net signal. In FIG. 2, the three conductors are designated 31, 32 and 33 and their respective pickup coils are designated 41, 42 and 43, with leads 44, 45 and 46 respectively to integrator amplifier means 47 which may deliver its output to a current indicating device or devices 48.

As employed herein, with respect to coil 41 for example, the term "adjacent conductors" will be used to designate conductors 32 and 33, and the term "opposite conductor" will be used to designate conductor 31.

Particular reference is made now to FIG. 4 which shows a detailed view of a suitable coil construction for use at 41, 42 or 43. The turns of wire 51 are enclosed in a loop-shaped insulating housing 52 which may be shielded by metal, not shown, to protect the coils from the elements, it being understood that the metal is non-magnetic and so arranged as not to interfere with the passage of magnetic lines of force from the conductors to the turns of wire of the coil. In FIG. 4, the "axis" of the coil is vertical, and the "plane" of the coil is horizontal.

Particular reference is made now to FIG. 5 which shows a second detailed view of a suitable coil construction for use in FIG. 2. In the coil of FIG. 5, wire 51' and housing 52' are seated in an annular groove 54 in a member 55 composed of magnetic material. The "flux gathering" core member 55 serves the purpose of providing a core of high permeability to increase the flux density in the coil 51' and accordingly to increase the output of the coil for a given field strength applied thereto. It will be understood that the core 55 may be composed of any suitable magnetic material, but must be laminated or of low conductivity so as to prevent closed conducting paths through it parallel to the coil winding.

Particular reference is made now to FIG. 3, which shows one means for supporting the coils in their triangular positions with respect to the transmission line. A post, which may be composed of non-metallic material, or which may be composed of suitably arranged non-magnetic metal, is designated 58 and has coils 43, 42 and 41 mounted thereon by supports 63, 62 and 61 which may be attached in any suitable manner to the post 58 and to the arms 59 and 60 as by extending into bores therein, not shown. It is seen that the coils are symmetrically disposed with respect to a central point designated C in FIG. 3.

As will be readily understood by those skilled in the art, in making flux measurements, in order to obtain a direct record of flux density it is desirable to utilize a circuit in which the flux coil voltage is impressed across a high resistance in series with a large capacitor, in which R and C have values such that practically all of the coil voltage is across the resistor, and only a negligible part of it is across the series capacitor. The current that flows is then proportional to the voltage in the coil, but this current produces a voltage on the capacitor proportional to the integral of the current, that is, proportional to the integral of the flux coil voltage. This voltage integral can be shown to be proportional to the flux linking the pickup coil. The capacitor voltage is amplified, and may be recorded on an oscillograph, or may be supplied to a suitable indicator to give a direct record or measurement or indication of flux or flux density.

In FIG. 7, an amplifier is employed in a conventional feedback circuit to insure that the voltage across the input terminals is small compared to the voltage across the coil and the voltage across resistor 75. The pickup coil 70 which it is understood may be used at 41, 42 and 43 in FIG. 2, has one terminal thereof connected by lead 71 to one input terminal 72 of a high gain direct current amplifier generally designated 73, whereas the other terminal of the pickup coil 70 is connected by way of lead 74, resistor 75 and lead 76 to the other input terminal 77 of the direct current amplifier 73. The direct current amplifier 73 has two output terminals 78 and 79, and it is seen that the capacitor 80 is connected between output terminal 78 and input terminal 77, whereas terminal 79 is connected to terminal 72. The output at terminals 78–79 may also be connected by leads 81 and 82 to a further amplifier and indicator 83 of any convenient design for giving an indication of flux density, and it will be understood that the indicating device in 83 may also be calibrated to read directly in values of current in the high voltage conductor which induces the signal in coil 70. As will be readily understood, in the art sometimes oscillographic devices are utilized for recording flux resulting from currents in high voltage transmission lines, and accordingly a standard oscillograph element 84 is shown connected by way of resistor 85 to output terminals 78 and 79. It will be understood that this oscillograph element may be dispensed with where it is not desired to use this type of indication or recording.

As previously stated, one of the objects of the invention is to provide an arrangement illustrated in FIG. 2 whereby substantially perfect separation of current indications may be achieved with relatively remote (in terms of line spacing) magnetic field pickup devices utilizing only the directional properties of the pickups. The net response of such devices is proportional not to the magnitude of the magnetic flux density in their vicinity but to the net amount of flux passing through them. The coil is not responsive to lines of force lying in the plane of the coil; the response increases as the angular deviation of the flux lines from the plane increases, until maximum response is obtained for lines perpendicular to the plane of the coil. In the case of the Hall generator embodiment of FIG. 6 hereinafter to be described, the response is proportional to the flux and the cosine of the angle at which it arrives; maximum response is to flux passing through the flat wafer of the Hall generator consisting of lines of force perpendicular to the plane which is parallel to and lies between the two broad surfaces. In FIG. 2, by placing the axis of the coil 41 for example in the plane of relatively long straight conductors 32 and 33 the flux due to current in these conductors will pass edgewise through the plane of the pickup 41 and so will have no net linkage with and will not induce any net voltage in the pickup device. In FIG. 2, the symmetrical triangular array of three phase conductors of a three phase transmission line is assumed to be essentially straight and parallel for a span distance long compared with their conductor separations. Near the center of the span the pickup coils illustrated are placed, midway between conductors on preferably perpendicular lines joining pairs of adjacent conductors, with their planes perpendicular to these lines, or in other words, with their axes lying in the planes defined by the adjacent conductors. In this position, each coil will receive no net linking flux from either adjacent conductor, but will be linked by the full magnitude of the flux due to current in the opposite conductor a distance "r" away and lying in the plane of the coil. Even without perfect symmetry, zero mutual inductance may be achieved between each pickup device and its adjacent conductors if its axis lies in the same plane with the adjacent conductors.

If the conductors are only approximately straight and coplanar, each pickup coil may be adjusted in position by trial with current flowing in the adjacent conductors only until there is no indication of these currents, or, with symmetrical three phase current flowing, until the indication agrees in phase with the current in the opposite conductor.

As previously stated, the pickup devices may be supported by any suitable structure at ground potential, for example, by the vertical post 58 which has a branch point near the center line of the triangular conductor array, all electrical leads being brought to a location near ground through the support. As previously stated, the support must not include any magnetic shielding which would interfere with the magnetic fields from the conductors, by induced magnetism or eddy currents, but it may provide electrostatic shielding which by virtue of high resistivity or a lack of closed flux-linking paths does not interfere with the magnetic fields to be sensed. The conductor spacing must be sufficient to provide safe electrical isolation between the high voltage conductors and the pickup devices, but this will require only slightly larger phase spacing than the normal minimum for phase isolation. Assuming symmetrical three phase voltages, the ratio of minimum phase (line to line) spacings (S) with the grounded pickups to those without, considered normal spacing (Sn), neglecting pickup dimensions, is given by the formula:

$$S/S_n = \frac{2}{\sqrt{3}} \cong 1.15.$$

If the pickup diameters do not exceed 1/12 the phase spacing, a total increase in phase spacing of 25% would be adequate to allow some safety margin.

As previously stated means for increasing the voltage or power output of the pickup devices include laminated iron or soft ferrite cores or pole pieces, for example a device similar to that shown in FIG. 5, and amplifiers preferably employing solid state components, such as transistors or magnetic amplifiers. The power capacity of the amplifiers is suited to the demand of the instruments, meters or relays to be supplied, and the amplifiers have input sensitivity levels adequate for accurate and reliable control by the pickup devices.

As an example of a condition which might be met in practice, let it be supposed by way of illustration that in a 345 kv. line a phase spacing S of six meters (about 20 feet) is required, and that the pickup coil may have an effective area of 0.05 m². (about 0.25 meter, approximately equal to 10 inches, in diameter), then the following formula may be used for the mutual inductance:

$$M = \frac{2nA \times 10^{-7}}{r} \text{ henries,}$$

and for the induced emf:
$e = 2\pi fMI$ volts
where:
$n$ = coil turns
$A$ = coil area = 0.05 m.²

$r$ = coil spacing = $(\sqrt{3}/2)$ S = $\sqrt{3} \times 3$ m. = 5.2 m.
$f$ = system frequency = 60 cycles/sec.
$I$ = current in amperes These formulas yield a final relation:

$$e = \frac{8\pi fnA \times 10^{-7} I}{S\sqrt{3}} = 7.26 \times 10^{-7} nI.$$

To obtain one volt coil output for a line current of 2000 amperes, coil turns of $$n = \frac{10^7}{(7.26 \times 2000)} = 688$$

and this would be the number of turns required. Since resistance is needed in the coil circuit for integration, the coil itself may well be wound with resistance wire such as Constantin, with small temperature coefficient to minimize the effect of temperature changes on the accuracy of indication.

If desired, the live conductors could be enclosed in a medium such as insulating oil or compressed gas; all dimensions could be reduced at a given voltage in inverse ratio to the dielectric strength of the medium with respect to that of atmospheric air. In such cases, the same principle of pickup positioning could be used, but with corresponding reduction in coil diameter; the number of coil turns would need to be increased in reciprocal ratio to the dimensional reduction. If, for example, voltage gradients were increased by a factor of 10, conductor spacing would be two feet, coil diameter would be one inch, and the number of coil turns would be 6880.

Particular reference is made now to FIG. 6 in which an embodiment of the invention employing Hall generators is shown. In FIG. 6, the conductors 91, 92 and 93 disposed in a preferably equilateral triangular relationship have their respective Hall generators 101, 102 and 103, carefully placed so that the field emanating from conductor 91 strikes the Hall generator 101 in a manner to cause the generation of a signal therein in accordance with well known principles of the operation of Hall generators, whereas the fields from conductors 92 and 93 strike the Hall generator 101 in manners which do not cause the generation of any appreciable signal thereby. It will be noted from FIG. 6 that each of the Hall generators 101, 102 and 103 has four leads thereto, two of these leads coming from opposite sides being supplied for the purpose of applying a direct current energizing potential from a source 89 to the Hall generator, and the other two leads coming from opposite ends being provided to obtain the useful signal from the device. Leads 107 and 108 from generator 101, leads 109 and 110 from generator 102, and leads 111 and 112 from generator 103, are connected to amplifier and indicating devices, not shown for convenience of illustration, individual to the Hall generators.

It will be readily understood that where Hall generators are employed, it may not be necessary or desirable to employ in integrating amplifier; linear signal amplifiers, not shown, supply outputs to indicating devices which may be calibrated to read either the flux intensity at the Hall generator, or may be directly calibrated to read values of current in the respective conductors.

Particular reference is made now to FIG. 8 where an additional and preferred embodiment of the invention is shown. In FIG. 8, the three parallel conductors 94, 95 and 96 are disposed in the same horizontal plane, as is frequently found in high voltage transmission line practice. Each of the conductors 94, 95 and 96 has a half loop portion 104, 105 and 106 respectively. Disposed in line with the respective conductors are three pickup coils 114, 115 and 116 respectively. It will be seen that the pickup coil of the center conductor is spaced a certain distance from the pickup coil of the adjacent conductor on one side, this distance being measured in the plane formed by the three conductors and in a direction parallel to the conductors; the coil of the center pickup conductor is spaced a distance $S\sqrt{2}$ from the pickup coil of the conductor on one side, and is spaced a similar distance equal to $S\sqrt{2}$ in the opposite direction from the coil of the conductor lying on the other side, the distance S corresponding to the spacing between adjacent high voltage conductors.

As seen in FIG. 8, the pickups, which may be simple flat coils of wire, are located with their centers in the plane of the line conductors, and with their axes lying in this plane and perpendicular to the conductors. In this position, there are no net flux linkages between any of the coils and the straight portions of any of the line conductors, or in other words, the mutual inductances between the coils and the line conductors are zero in every case. To achieve the desired coupling, half loops concentric with the pickups are made in the line conductors, as shown in FIG. 8. The half loops lie in planes perpendicular to the common plane of the line conductors, vertical planes in the example shown. In this position, if the loop radius is much larger than the pickup coil radius, the mutual inductance between each pickup coil and its associated half loop of line conductor is given to a very close approximation by the formula:

$$M = \frac{nA\pi \cdot 10^{-7}}{r''} \text{ henries}$$

where:

$n$ = number of coil turns
$A$ = means area of coil turns in square meters, and
$r''$ = radius of half loop in meters.

Since the coils and half loops act approximately as magnetic dipoles at distances much greater than their radii, and the strength of the field from such a dipole falls off as the inverse cube of the distance from the centers, mutual inductance between the pickups and the half loops in adjacent line wires may be made negligibly small by separating the coupling loops in adjacent wires by only a few times the half loop radius. For example, the cross coupling with an adjacent line wire pickup will be reduced to less than 1% of that of its own pickup if the half loop in an adjacent wire is spaced more than five loop radii down the line. However, this spacing along the line can be minimized and the cross-coupling reduced actually to zero by employing the spacing illustrated in FIG. 8, equal to $S\sqrt{2}$, where S is the spacing between adjacent line conductors. In fact, the mutual inductance between any pickup coil and any half loop other than its own will be zero so long as the pickup points are located on the line, shown dashed in FIG. 8, which lies in the plane of the conductors and makes an angle $$\phi = \arctan \sqrt{\frac{2}{2}} \cong 35°$$

with the line direction. This is true for any number of coplanar conductors, and so the arrangement can be used with an array of any number of parallel coplanar circuits, such as may be needed in a large substation or switch yard.

The principles set forth hereinbefore hold true for any directional magnetic pickup device, and also for loops or half loops in the conductors of other than strictly circular shape. The requirement is that the minimum loop radius provide adequate spacing to the pickup device which is at ground potential to withstand the conductor potential without flashover, and that the mean loop radius be substantially less than the spacing along the line between loops in adjacent conductors. Such half loops supported by suspension insulator strings are commonly employed at tower support points in high voltage line construction. To achieve the coupling of pickups exclusively with each associated line conductors, the support tower member at the coupling point is placed with its cross member at the angle 35° to the line rather than at 90° to the line. Thus, the coupling devices are supported by a near standard tower having a cross member 73% longer than normal set at a 35° angle to the line.

In FIG. 8, the output of each of the pickup coils 114, 115 and 116 is fed to an integrator amplifier which may be similar to that shown in FIG. 7, not shown for convenience of illustration, the output of which integrator amplifier is supplied to an indicating device, not shown for convenience of illustration, which may be calibrated to read the flux at the coil, or may be directly calibrated to read values of conductor current. The indicators may faithfully represent the current in the associated line conductors in phase, amplitude and waveform, including transient components of reasonably long duration, as will be readily understood by those skilled in the art.

The embodiment and arrangement of FIG. 8 includes the use of Hall generator devices located in the same positions as coils 114, 115 and 116 and replacing the pickup coils, with the plane of the Hall generator coinciding with the plane of the half loop, it being understood that each of the Hall generator devices has four leads thereto, two of these leads being employed for supplying a direct current energizing potential to the device, and two of the leads being used for obtaining an output signal from the device. The amplifiers used in conjunction with FIG. 8 have gains to suit the input requirements of relays or meters as desired.

As will be readily understood, one problem in transmission line monitoring is interference from momentary currents in protecting ground wires where these are used. The invention contemplates the arrangement of FIG. 8 altered to arrange the conductors in a vertical array or plane of line conductors, with the ground wire also in the same plane but at the top of the array. The conductor half loops would then be supported in horizontal planes with the axes of the pickups vertical. The mutual coupling between the pickups and the ground wire would then be zero.

Particular reference is made now to FIG. 9, where the embodiment of FIG. 8 is shown in conjunction with a protective ground wire or wires. In FIG. 9, the three high voltage conductors are disposed in a horizontal array similar to FIG. 8. Two principal ground conductors 97 and 98 are placed in the plane of the line conductors on the outsides thereof. One or more additional ground conductors 99 are placed above the line, and this ground conductor 99 is separated into relatively short sections by single element strain insulators 100. Each so isolated short section of the ground wire 99 is connected to one or both outside ground wires by one or more transverse conductors, as shown in FIG. 9. Such an array of ground conductors gives more nearly complete protection from lightning than the usual overhead ground wires alone. It is needed, of course, only in the vicinity of the magnetic field pickups; beyond this region the normal overhead ground wire arrangement may be used.

The invention is also applicable to two phase systems having a common return for both phases.

In summary, there has been described a novel arrangement for magnetic coupling of grounded current measuring circuit elements to a high voltage multiconductor transmission line in such a way that each of such elements responds solely to the current in one of the line conductors without being affected by current in any other conductor, including ground conductors. Such an arrangement is especially useful for operating protective relays controlling the tripping of high voltage circuit breakers which are not equipped with current transformers.

Whereas the conductors of FIGS. 2 and 6 have been shown and described as disposed in a substantially equilateral triangle, it should be understood that this arrangement gives greatest field strength at all the magnetic field sensitive devices from the desired or "opposite" conductors. The triangle need not be equilateral, so long as each coil has its axis in the plane of adjacent conductors and preferably perpendicular thereto to provide cancellation. If the desired or "opposite" conductor does not lie in the plane of its coil, some loss of sensitivity results.

Whereas the invention has been shown and described with respect to some exemplary embodiments thereof which give satisfactory results, it should be understood that changes may be made and equivalents substituted without departing from the spirit and scope of the invention.

I claim as my invention:

1. Current measuring apparatus for a high voltage three phase transmission line having first, second and third substantially parallel conductors disposed in a triangular pattern comprising, in combination, a first pickup coil mounted between the first and second conductors and having the axis of the coil disposed in the plane of the first and second conductors and substantially perpendicular to said first and second conductors, a second pickup coil mounted between the second and third conductors and having the axis thereof disposed in the plane of the second and third conductors and substantially perpendicular to said second and third conductors, a third pickup coil disposed between the first and third conductors, the third pickup coil having the axis thereof lying in the plane of the first and third conductors and substantially perpendicular to the first and third conductors, and first, second and third current measuring utilization means electrically connected to the first, second and third pickup coils and having the signals induced in the first, second and third pickup coils applied thereto respectively, the signals in the first, second and third pickup coils varying in amplitude with variations in the currents in the third, first and second conductors respectively.

2. Apparatus according to claim 1 wherein each of the first, second and third pickup coils is additionally characterized as including a flux gathering core of magnetizable material.

3. Current measuring apparatus comprising, in combination, first, second and third substantially parallel conductors disposed in a substantially equilateral triangular pattern, a first inductor coil mounted substantially midway between the first and second conductors in a manner whereby the third conductor is in the plane of the first inductor coil, a second inductor coil mounted substantially midway between the second and third conductors in a manner whereby the first conductor lies in the plane of the second inductor coil, a third inductor coil mounted substantially midway between the first and third conductors whereby the second conductor lies in the plane of the third inductor coil, integrating amplifier means electrically connected to the first, second and third inductor coils, and indicating means operatively connected to the integrating amplifier means for giving a plurality of indications which vary with variations in the signals induced in the first, second and third inductor coils and accordingly vary with changes in the magnetic field about the third, first and second conductors respectively.

4. Apparatus according to claim 3 wherein each of the inductor coils is additionally characterized as having a flux gathering core composed of magnetic material.

5. A current measuring device for use with a high voltage transmission line having first, second and third substantially parallel conductors disposed in a substantially equilateral triangular pattern comprising, in combination, a first Hall generator disposed substantially midway between the first and second conductors, means connected to the first Hall generator for energizing the same, the first Hall generator being disposed in predetermined position whereby magnetic lines of force originating at the first and second conductors do not cause a signal to be generated in the first Hall generator whereas magnetic lines of force originating at the third conductor cause a signal to be generated by the first Hall generator, a second Hall generator disposed substantially midway between the second and third conductors, means for energizing the second Hall generator, the second Hall generator being disposed in a manner whereby magnetic lines of force originating at the second and third conductors do not cause a signal to be generated by the second Hall generator whereas magnetic lines of force originating at the first conductor cause a signal to be generated by the second Hall generator, a third Hall generator disposed substantially midway between the first and third conductors, means for energizing the third Hall generator, the third Hall generator being disposed in a position whereby magnetic lines of force originating at the first and third conductors do not cause an electrical signal to be generated by the third Hall generator whereas magnetic lines of force originating at the second conductor cause a signal to be generated by the third Hall generator, and amplifying and indicating means operatively connected to all of the first, second and third Hall generators.

6. A current measuring system comprising, in combination, first, second and third substantially parallel conductors disposed in a substantially equilateral triangular pattern with respect to each other, a first Hall generator disposed substantially midway between the first and second conductors, a second Hall generator disposed substantially midway between the second and third conductors, a third Hall generator disposed substantially midway between the first and third conductors, means connected to the first, second and third Hall generators for energizing the same, the first, second and third generators being positioned in predetermined manners whereby the first Hall generator has a signal generated therein only by magnetic lines of force originating at the third conductor, the second Hall generator has a signal generated therein only by magnetic lines of force originating at the first conductor, the third Hall generator has a signal generated therein only by magnetic lines of force originating at the second conductor, and amplifier and indicating means operatively connected to the first, second and third Hall generators for giving indications which vary with variations in the signals produced by the first, second and third Hall generators and accordingly with variations in the current in the third, first and second conductors respectively.

7. Current measuring apparatus comprising, in combination, first, second and third substantially parallel conductors disposed in a substantially equilateral triangular pattern, first, second and third inductors disposed in predetermined positions with respect to the conductors, each of the inductors being disposed substantially midway between two adjacent conductors with the axis of the inductor being substantially on a line perpendicular to the two adjacent conductors and the plane of the inductor passing substantially through the opposite conductor, each of the inductors including a flux collecting core of magnetic material, each of the inductors having substantially no signal induced therein by flux arriving from the two adjacent conductors which lie in axial directions with respect to the inductor and having a signal induced therein only by flux from the opposite conductor lying in the plane of the inductor, a plurality of amplifier and integrator means for the plurality of inductors respectively, and a plurality of indicator means operatively connected to the plurality of integrator and amplifier means for utilizing the signals generated by the inductors as the flux thereat changes to provide measurements of the currents in the three conductors.

8. Current measuring apparatus comprising, in combination, three substantially parallel conductors disposed in the same plane and spaced from each other a predetermined distance, each of the conductors having a portion thereof bent to form a half loop at a predetermined position therein, the loop center in one outer conductor being spaced a predetermined distance from the loop center in the inner conductor in one direction and the loop center in the other outer conductor being spaced a similar predetermined distance in the opposite direction from the loop center in the inner conductor, said distance corresponding in amounts to $S\sqrt{2}$, where S is the predetermined distance of the spacing between conductors, and three pickup coils disposed in the three half loops respectively, each of the pickup coils having its axis in the plane of the three conductors and extending perpendicular to the three conductors, the plane of each pickup coil lying in the plane formed by the adjacent half loop, and three means including indicating means connected to the three pickup coils respectively for utilizing signals generated in the pickup coils by magnetic lines of force originating in the respective half loops in the conductors to provide measurements of the currents in said conductors.

9. Apparatus according to claim 8 wherein the three substantially parallel conductors are additionally characterized as lying in a substantially horizontal plane, and including in addition first and second ground wire means disposed on each side of the two outer conductors, and third ground wire means disposed above the conductors, the third ground wire means including insulator means for breaking the third ground wire means into short sections, and wires connecting the sections to both the first and second ground wire means.

10. Current measuring apparatus comprising, in combination, two substantially parallel conductors spaced apart a predetermined distance, each of said conductors having a half loop portion, corresponding points in the half loop portions being spaced from each other in a direction measured parallel to the conductors said predetermined distance times the square root of two, two directional magnetic field pickup devices disposed substantially at the axial centers of the half loop portions in predetermined positions with respect to the half loop portions whereby signals are induced therein by magnetic lines of force originating in the half loop portions, and utilization means including indicating means connected to the two pickup devices.

11. Apparatus according to claim 10 wherein the pickup devices are additionally characterized as being Hall generators, and including in addition means for applying direct current potentials to the Hall generators to energize the same.

12. Apparatus according to claim 10 wherein each of the pickup devices is additionally characterized as consisting of an inductor coil having a core of flux collecting magnetic material, the utilization means includes a plurality of integrator amplifier devices, and the indicating means utilizes the signals induced in the coils to provide measurements of the currents in the conductors.

13. Current measuring apparatus comprising, in combination, two conductors disposed substantially parallel to each other at a spaced interval, each of the two conductors having a bent portion forming a half loop therein, the centers of the half loops lying on a line passing at an angle of 35° with respect to both of the conductors, two directional pickup devices disposed substantially axially of the two half loops respectively and coplanar therewith respectively, and two indicator means operatively connected to the two pickup devices respectively.

14. In current measuring apparatus for use with first and second substantially parallel conductors spaced from each other a predetermined distance and carrying alternating currents which differ in phase from each other, in combination, first loop forming means in the first conductor forming at least a half loop of at least 180 degrees, second loop forming means in the second conductor forming at least a half loop of at least 180 degrees, the loop in one conductor being spaced from the loop in the other conductor a distance measured parallel to the conductors equal to $S\sqrt{2}$, where S is the spacing between conductors, and first and second directional magnetic field sensitive means mounted at substantially the centers of the loops in the first and second conductors respectively, magnetic lines of force originating at the first loop arriving at the first magnetic field sensitive means in a direction to cause the generation of a signal whereas magnetic lines of force from the remainder of the first conductor and from the second conductor arrive at the first magnetic field sensitive means in a direction to cause no signal to be generated thereby, magnetic lines of force originating at the second loop arriving at the second magnetic field sensitive means in a direction to cause the generation of a signal whereas magnetic lines of force from the remainder of the second conductor and from the first arrive at the second magnetic field sensitive means in a direction to cause no signal to be generated thereby, the signal at the first magnetic field sensitive means varying in amplitude with variations in the current in the first conductor and the signal at the second magnetic field sensitive means varying in amplitude with variations in the current in the second conductor.

15. Current measuring apparatus for a three phase transmission line having first, second and third substantially parallel and substantially straight conductors disposed in a triangular pattern, comprising, in combination, first, second and third directional magnetic field sensitive devices, each of the magnetic field sensitive devices having a sensitive plane and a non-sensitive axis perpendicular to said plane, magnetic lines of force arriving at the device from current carrying conductors lying in said plane causing the generation of a signal by the device while magnetic lines of force arriving at the device from current carrying conductors intersecting the non-sensitive axis cause no signal to be generated by the device, the first magnetic field sensitive device being disposed substantially midway between the first and second conductors with the non-sensitive axis lying in the plane of the first and second conductors and substantially perpendicular to said first and second conductors, the second magnetic field sensitive device being disposed substantially midway between the second and third conductors with the non-sensitive axis thereof lying in the plane of the second and third conductors and substantially perpendicular to said second and third conductors, the third magnetic field sensitive device being disposed substantially midway between the first and third conductors with the non-sensitive axis thereof lying in the plane of the first and third conductors and substantially perpendicular to said first and third conductors, and signal utilization means electrically connected to all of said first, second, and third magnetic field sensitive devices for measuring the currents in the conductors.

16. Current measuring apparatus for use with a high voltage transmission line including three conductors extending parallel to each other and disposed in a substantially equilateral triangular pattern comprising, in combination, a plurality of directional magnetic field sensitive devices equal in number to the number of conductors, each of the field sensitive devices being disposed substantially midway between a different pair of conductors with a predetermined axis of each field sensitive device lying substantially on a line between two adjacent conductors and the plane of the field sensitive device passing through an opposite third conductor, each field sensitive device generating a signal only in response to magnetic lines of force originating at said opposite conductor which lies in the plane of the device, and means including indicating means operatively connected to all of the magnetic field sensitive devices for utilizing the signals generated thereby to provide individual indications of the currents in said conductors.

References Cited by the Examiner

UNITED STATES PATENTS

| 1,098,664 | 6/1914 | Dobrowolsky | 336—171 X |
| 1,577,421 | 3/1926 | Hazeltine | 336—171 |
| 3,199,026 | 8/1965 | Leibowitz | 324—127 |

OTHER REFERENCES

W. E. Bulman, Hall-Effect Generators, Electronic Design, Mar. 4, 1959, pp. 28–31.

WALTER L. CARLSON, *Primary Examiner*.

RUDOLPH V. ROLINEC, *Examiner*.

J. J. MULROONEY, *Assistant Examiner*.